United States Patent
Kim et al.

(10) Patent No.: US 11,912,610 B2
(45) Date of Patent: Feb. 27, 2024

(54) COATING COMPOSITION HAVING INFRARED REFLECTIVE FUNCTION, COATING GLASS AND METHOD FOR PREPARATION THEREOF, AND COOKING APPLIANCE USING SAME

(71) Applicants: LG Electronics Inc., Seoul (KR); KONGJU NATIONAL UNIVERSITY INDUSTRY-UNIVERSITY COOPERATION FOUNDATION, Chungcheongnam-do (KR)

(72) Inventors: Taeho Kim, Seoul (KR); Dongwan Seo, Seoul (KR); Yongsoo Lee, Seoul (KR); Taehee Kim, Seoul (KR); Ju Hyeong Kim, Seoul (KR); Woon-Jin Chung, Chungcheongnam-do (KR); Hansol Lee, Chungcheongnam-do (KR); In-Gun Kim, Chungcheongnam-do (KR)

(73) Assignees: LG Electronics Inc., Seoul (KR); KONGJU NATIONAL UNIVERSITY INDUSTRY-UNIVERSITY COOPERATION FOUNDATION, Chungcheongnam-do (KR)

( * ) Notice: Subject to any disclaimer, the term of this patent is extended or adjusted under 35 U.S.C. 154(b) by 619 days.

(21) Appl. No.: 16/945,343

(22) Filed: Jul. 31, 2020

(65) Prior Publication Data
US 2021/0032158 A1   Feb. 4, 2021

(30) Foreign Application Priority Data

Jul. 31, 2019 (KR) .................. 10-2019-0093512

(51) Int. Cl.
*C03C 17/00* (2006.01)
*C03C 17/23* (2006.01)
(Continued)

(52) U.S. Cl.
CPC ............ *C03C 17/23* (2013.01); *A47J 27/002* (2013.01); *C03C 17/001* (2013.01); *B82Y 30/00* (2013.01);
(Continued)

(58) Field of Classification Search
None
See application file for complete search history.

(56) References Cited

U.S. PATENT DOCUMENTS

2005/0084718 A1   4/2005 Tomonaga et al.
2007/0292695 A1  12/2007 Kodaira et al.
(Continued)

FOREIGN PATENT DOCUMENTS

| WO | WO-03004580 A1 * | 1/2003 | ............ C09K 5/063 |
|----|------------------|--------|------------------------|
| WO | WO2014053249     | 4/2014 |                        |

OTHER PUBLICATIONS

EP Extended Search Report in European Appln. No. 20188531.6, dated Dec. 7, 2020, 8 pages.
(Continued)

*Primary Examiner* — Stefanie J Cohen
(74) *Attorney, Agent, or Firm* — Fish & Richardson P.C.

(57) ABSTRACT

A coating composition, coating glass and a method for preparation thereof, and a cooking appliance including the coating class are described. The coating composition includes a coating material and a heat conductive oxide nano powder that is 5 to 10 wt % with respect to a weight of the coating material. The coating composition provides an excellent infrared reflective function, a high transmittance, and an excellent cleaning performance.

7 Claims, 2 Drawing Sheets

(51) Int. Cl.
 *A47J 27/00* (2006.01)
 *B82Y 30/00* (2011.01)
(52) U.S. Cl.
 CPC .............. *C03C 2217/214* (2013.01); *C03C 2217/216* (2013.01); *C03C 2217/22* (2013.01); *C03C 2217/228* (2013.01); *C03C 2217/229* (2013.01); *C03C 2217/23* (2013.01)

(56) References Cited

U.S. PATENT DOCUMENTS

| | | | |
|---|---|---|---|
| 2008/0020134 A1 | 1/2008 | Tomonaga et al. | |
| 2013/0299483 A1* | 11/2013 | Kim .......................... | C03C 3/21 501/29 |
| 2018/0022930 A1 | 1/2018 | Koyo et al. | |
| 2018/0045419 A1* | 2/2018 | Kim .................... | H01H 19/025 |
| 2018/0170797 A1 | 6/2018 | Gorecki et al. | |
| 2018/0215655 A1 | 8/2018 | Kim et al. | |
| 2019/0071347 A1 | 3/2019 | Kim et al. | |

OTHER PUBLICATIONS

PCT International Search Report in International Appln. No. PCT/KR2020/010076, dated Nov. 24, 2020, 3 pages.

* cited by examiner

COATING COMPOSITION HAVING INFRARED REFLECTIVE FUNCTION, COATING GLASS AND METHOD FOR PREPARATION THEREOF, AND COOKING APPLIANCE USING SAME

CROSS-REFERENCE TO RELATED APPLICATION

This application claims priority to and the benefit of Korean Patent Application No. 10-2019-0093512, filed on Jul. 31, 2019, the disclosure of which is incorporated herein by reference in its entirety.

TECHNICAL FIELD

The present disclosure relates to a coating composition having an infrared reflective function, coating glass and a method for preparation thereof, and a cooking appliance using the same.

BACKGROUND

Cooking appliances such as electric ovens and gas ovens may be used to cook food or other items (hereinafter, collectively "food") using a heat source. In some cases, contaminants may be produced during cooking and attached to an inner wall of a cavity and an inner surface of a door of a cooking appliance. Accordingly, the inner wall of the cavity and the inner surface of the door may be cleaned. In some cases, a coating layer may be disposed on the inner wall of the cavity or on the inner surface of the door of the cooking appliance to help to remove the contaminants attached to the cooking appliance.

In some cases, the door of the cooking appliance may include door glass such that users look into the cooking appliance. In some cases, contaminants produced during cooking may also be attached to the door glass. To clean a surface of the door glass, a coating layer may be disposed on an inner surface of the door glass.

An inside of the cooking appliance such as ovens may be heated to a high temperature to cook food. Accordingly, a door of the oven may be also heated at a high temperature, and in some cases, users may be burned. In some cases, door glass of the cooking appliance may have an infrared reflective function. For instance, an infrared reflective coating layer including a component such as titanium (Ti) and tin (Sn) may experience oxidation and degradation of reflection efficiency when it continues to be exposed to heat. In some cases, a unit cost of the infrared reflective coating layer including a component such as titanium (Ti) and tin (Sn) may be high.

In some cases, the coating layer may have a low light transmittance in which users may not clearly look into the cooking appliance.

Although the coating layer may be cleaned under a condition of high temperature or soaking, the door glass may not be cleaned in such a condition.

In some cases, the coating layer may be applied to a glass substrate such as door glass of a cooking appliance.

SUMMARY

The present disclosure describes a coating composition that may provide an infrared reflective function.

The present disclosure also describes a coating composition that may provide a high light transmittance.

The present disclosure also describes a coating composition that may help to remove contaminants with a wet kitchen scrubber, for instance.

The present disclosure also describes a manufacturing method for coating a coating composition on a glass substrate such as door glass of a cooking appliance.

According to one aspect of the subject matter described in this application, a coating composition includes a coating material and a heat conductive oxide nano powder that is 5 to 10 wt % with respect to a weight of the coating material. The coating material includes 20 to 40 wt % of phosphorus pentoxide ($P_2O_5$), 15 to 30 wt % of aluminum oxide ($Al_2O_3$) and zirconium dioxide ($ZrO_2$), 10 to 30 wt % of sodium oxide ($Na_2O$) and potassium oxide ($K_2O$), 10 to 25 wt % of boron trioxide ($B_2O_3$), and 10 to 15 wt % of zinc oxide (ZnO).

Implementations according to this aspect may include one or more of the following features. For example, the coating material may include 5 or less wt % of at least one of lithium oxide ($Li_2O$), barium oxide (BaO), or calcium oxide (CaO). In some examples, the coating material may include 17 to 29.5 wt % of $Al_2O_3$, and 0.5 to 3 wt % of $ZrO_2$. In some examples, the coating material may include 10 to 20 wt % of $Na_2O$, and 5 to 10 wt % of $K_2O$.

In some implementations, the heat conductive oxide nano powder may include at least one of indium tin oxide (ITO), tin oxide ($SnO_x$), titanium oxide ($TiO_x$) and zinc oxide ($ZnO_x$). In some examples, a calcination temperature of the coating composition may be less than or equal to 700° C.

According to another aspect, a method for preparing coating glass includes providing a substrate that includes glass, applying a coating composition to the substrate, thermally treating the coating composition on the substrate at a temperature less than or equal to 700° C., and cooling the coating composition on the substrate. The coating composition includes a coating material and a heat conductive oxide nano powder that is 5 to 10 wt % with respect to a weight of the coating material. The coating material includes 20 to 40 wt % of phosphorus pentoxide ($P_2O_5$), 15 to 30 wt % of aluminum oxide ($Al_2O_3$) and zirconium dioxide ($ZrO_2$), 10 to 30 wt % of sodium oxide ($Na_2O$) and potassium oxide ($K_2O$), 10 to 25 wt % of boron trioxide ($B_2O_3$), and 10 to 15 wt % of zinc oxide (ZnO).

Implementations according to this aspect may include one or more of the following features or the features described above. For example, the coating material may include 5 or less wt % of at least one of lithium oxide ($Li_2O$), barium oxide (BaO), or calcium oxide (CaO). In some examples, the coating material may include 17 to 29.5 wt % of $Al_2O_3$, and 0.5 to 3 wt % of $ZrO_2$. In some examples, the coating material may include 10 to 20 wt % of $Na_2O$, and 5 to 10 wt % of potassium oxide $K_2O$. In some examples, the heat conductive oxide nano powder may include at least one of indium tin oxide (ITO), tin oxide ($SnO_x$), titanium oxide ($TiO_x$) and zinc oxide ($ZnO_x$). In some examples, a light transmittance of the coating glass for visible light may be greater than or equal to 80%.

According to another aspect, a cooking appliance includes a cooking chamber, a door configured to open and close the cooking chamber, the door including a door glass, a coating layer disposed at least one surface of the door glass and made of a coating composition, where the coating composition includes a coating material and a heat conductive oxide nano powder that is 5 to 10 wt % with respect to a weight of the coating material. The coating material includes 20 to 40 wt % of phosphorus pentoxide ($P_2O_5$), 15 to 30 wt % of aluminum oxide ($Al_2O_3$) and zirconium dioxide ($ZrO_2$), 10 to 30 wt % of sodium oxide ($Na_2O$) and potassium oxide ($K_2O$), 10 to 25 wt % of boron trioxide ($B_2O_3$), and 10 to 15 wt % of zinc oxide (ZnO).

Implementations according to this aspect may include one or more of the following features or the features described above. For example, a light transmittance of the door glass for visible light may be greater than or equal to 80%. In some examples, the coating material may include 5 or less wt % of at least one of lithium oxide ($Li_2O$), barium oxide (BaO), or calcium oxide (CaO). In some examples, the coating material may include 17 to 29.5 wt % of $Al_2O_3$, and 0.5 to 3 wt % of $ZrO_2$. In some examples, the coating material may include 10 to 20 wt % of $Na_2O$, and 5 to 10 wt % of $K_2O$. In some implementations, the heat conductive oxide nano powder includes at least one of indium tin oxide (ITO), tin oxide ($SnO_x$), titanium oxide ($TiO_x$) and zinc oxide ($ZnO_x$).

In some examples, a calcination temperature of the coating composition may be less than or equal to 700° C. In some examples, the coating layer may be coated on and in direct contact with the at least one surface of the door glass.

The coating composition may provide a light scattering effect with the help of the nano powder, thereby offering an infrared reflective function.

In some examples, components of the coating composition may be balanced with each other and may perform their functions, thereby providing a high light transmittance and a cleaning performance.

In some implementations, the coating composition may enable users to clearly look into a door.

In some implementations, the coating composition may have a high light transmittance as well as an infrared reflective function, and may be cleaned at a low temperature without being soaked in water.

according to implementations, the coating composition may be coated onto a glass substrate, such as door glass of a cooking appliance, thereby reducing manufacturing cost of coated glass.

DETAILED DESCRIPTION

Figure 1:
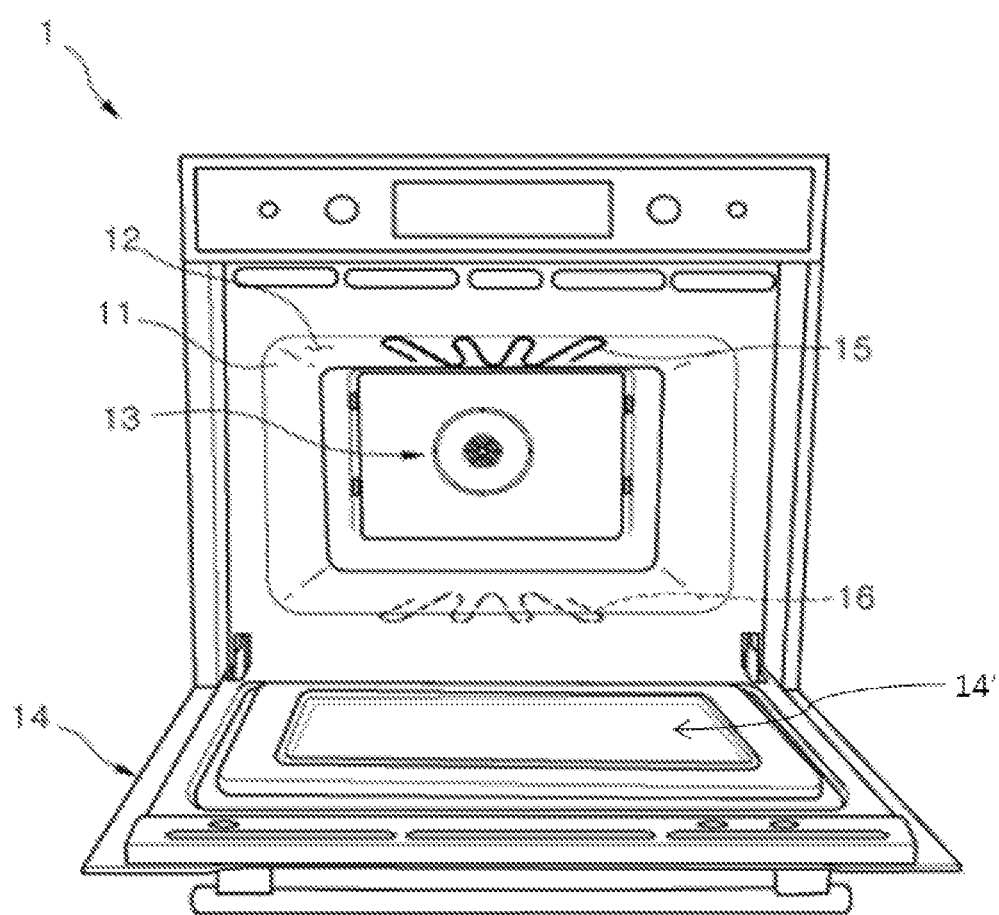
FIG. 1 is a front perspective view of an example of a cooking appliance.

The above-described aspects, features and advantages are specifically described with reference to the accompanying drawings hereunder such that one having ordinary skill in the art to which the present disclosure pertains may easily implement the technical spirit of the disclosure. In description of the disclosure, detailed description of known technologies in relation to the disclosure is omitted if it is deemed to make the gist of the present disclosure unnecessarily vague. Below, one or more implementations according to the present disclosure are specifically described.

The implementations set forth herein may be implemented in various different forms, and should not be construed as being limited to the present disclosure. Rather, these implementations are provided as examples so that the present disclosure will be thorough and complete and will fully convey the subject matter to one having ordinary skill in the art to which the disclosure pertains. Below, a coating composition, coating glass and a method for preparation thereof, and a cooking appliance using the same according to the present disclosure are described specifically.

One or more examples of coating compositions are described below.

In some implementations, a coating composition may include a coating material and a heat conductive oxide nano powder.

For example, the coating composition may include a coating material including 20 to 40 wt % of phosphorus pentoxide ($P_2O_5$), 15 to 30 wt % of aluminum oxide ($Al_2O_3$) and zirconium dioxide ($ZrO_2$), 10 to 30 wt % of sodium oxide ($Na_2O$) and potassium oxide ($K_2O$), 10 to 25 wt % of boron trioxide ($B_2O_3$), and 10 to 15 wt % of zinc oxide (ZnO), and 5 to 10 wt % of a heat conductive oxide nano powder with respect to 100 wt % of the coating material. For example, a weight of the nano powder in the coating composition may be 5 to 10% with respect to a weight of the coating material in the coating composition.

Components included in the coating composition are described below.

$P_2O_5$ is a component that may form a glass structure. $P_2O_5$ is also a glass former that may help addition of a large amount of transition metal oxides into a coating composition, and helps water to permeate between a surface of a coating and a contaminant such that the contaminant is easily removed. according to implementations, $P_2O_5$ may perform a function of improving light transmittance of the coating. In some examples, $P_2O_5$ may be included in a range of 20 to 40 wt %. When more than 40 wt % of $P_2O_5$ is included, the coating composition is hardly glazed, and thermal properties of the coating composition may be deteriorated. When less than 20 wt % of $P_2O_5$ is included, light transmittance and a cleaning performance of the coating may be degraded.

$Al_2O_3$ and $ZrO_2$ are components that may improve durability of phosphate-based glass and may enhance surface hardness of the coating. $Al_2O_3$ and $ZrO_2$ are included in a range of 15~30 wt %. When more than 30 wt % of $Al_2O_3$ and $ZrO_2$ is included, adhesion and light transmittance of the coating may decrease. When less than 15 wt % of $Al_2O_3$ and $ZrO_2$ is included, physical and chemical durability of the coating may decrease.

A larger amount of $Al_2O_3$ may be included than an amount of $ZrO_2$. According to implementations, when 17 to 29.5 wt % of $Al_2O_3$ is included and 0.5 to 3 wt % of $ZrO_2$ is included, desired light transmittance and durability of the coating may be obtained. For example, when 0.5 to 3 wt % of $ZrO_2$ is included, physical and chemical durability of the coating may be maintained while transmittance of the coating may not be degraded.

$Na_2O$ and $K_2O$ may decrease a calcination temperature of the coating composition while improving a cleaning performance of the coating composition. $Na_2O$ and $K_2O$ may be included in the coating composition in a range of 10 to 30 wt %. When more than 30 wt % of $Na_2O$ and $K_2O$ is included, a calcination temperature of the coating composition may not decrease, and a coating performance of the coating composition may decrease. When less than 10 wt % of $Na_2O$ and $K_2O$ is included, a cleaning performance of the coating composition may be deteriorated.

In some cases, a larger amount of $Na_2O$ may be included than an amount of $K_2O$. For instance, when 10 to 20 wt % of $Na_2O$ is included and 5 to 10 wt % of $K_2O$ is included, an excellent cleaning performance and a low calcination temperature of the coating may be obtained.

$B_2O_3$ may serve as a glass former and help each component of the coating composition to melt uniformly. $B_2O_3$ also enhances physical and thermochemical durability of the coating. $B_2O_3$ is included in a range of 10 to 25 wt %. When more than 25 wt % of $B_2O_3$ is included, the component may interfere with the addition of other components, thereby deteriorating a cleaning performance and failing to ensure a high light transmittance. When less than 10 wt % of $B_2O_3$ is included, glass composition may be collapsed, and crystallization of the glass may occur.

ZnO is a component that may enhance light transmittance of the coating composition. The coating composition may include 10 to 15 wt % of ZnO. The coating composition may include a larger amount of ZnO than a coating composition of the related art to maximize light transmittance of the coating. Additionally, in the coating composition, amounts of other components except ZnO are adjusted to maximize light transmittance and ensure excellent cleaning performance and durability. When less than 10 wt % of ZnO is included, a high light transmittance may not be ensured. When more than 15 wt % of ZnO is included, the component may interfere with the addition of other components, thereby causing a deterioration of cleaning performance and durability of the coating.

When an amount of ZnO increases among the coating components, a coefficient of thermal expansion of the coating may increase, and the coating may have cracks. Additionally, due to a chemical unbalance based on the increase in the amount of ZnO, the coating layer may melt in an acidic solution or an alkaline solution and its mark may be left. To solve the problem, an optimal amount of $ZrO_2$ is included in the coating composition. $ZrO_2$ is a component that helps glass to be crystalized easily. In some examples, the coating composition may include an optimal amount of $ZrO_2$ such that the coating layer may not leave a mark when it melts in an acidic solution or an alkaline solution.

The coating composition, in some implementations, may further include 5 or less wt % of one or more of lithium oxide ($Li_2O$), barium oxide (BaO) and calcium oxide (CaO). The one or more of $Li_2O$, BaO and CaO may control thermal and physical properties, for example, such as a coefficient of thermal expansion, thermal resistance and calcination temperature of the coating. When more than 5 wt % of one or more of $Li_2O$, BaO and CaO is included, the components may interfere with the addition of other components, thereby failing to ensure a high transmittance.

The coating composition, in some implementations, may have a composition ratio as described above and provide high light transmittance and excellent cleaning performance of the coating. Additionally, the coating composition may have thermal properties in which the coating composition is calcinated at a temperature of 700° C. or lower.

The heat conductive oxide (transparent conductive oxide) nano powder are described hereunder.

The heat conductive oxide nano powder may produce a light scattering effect in the coating composition. Thus, the coating composition may have an excellent infrared reflective function.

In some implementations, the heat conductive oxide nano powder may include one or more of indium tin oxide (ITO), tin oxide ($SnO_x$), titanium oxide ($TiO_x$) and zinc oxide ($ZnO_x$). For example, the heat conductive oxide nano powder may include ITO. In some cases, the heat conductive oxide nano powder may include one or more of particles having a size in a range between 1 nm and 1000 nm. For instance, the heat conductive oxide nano powder may include a plurality of particles having a size greater than 1 nm and less than 1000 nm. In some cases, the heat conductive oxide nano powder may include one or more sub-nanometer particles having a size less than 1 nm. In some cases, the heat conductive oxide nano powder may include one or more particles having a size greater than 1000 nm.

The coating composition, according to implementations, may include 5 to 10 wt % of the heat conductive oxide nano powder relative to 100 wt % of the coating material. When less than 5 wt % of the heat conductive oxide nano powder is included, an infrared reflective function may not be sufficiently implemented. When more than 10 wt % of the heat conductive oxide nano powder is included, light transmittance and cleaning performance of the coating may be deteriorated.

One or more examples of a method for preparing coating glass and coating glass prepared using the method are described below.

For example, a method for preparing coating glass may include preparing a substrate including glass, applying a coating composition onto the substrate, thermally treating the substrate and the coating composition, and cooling the substrate and the coating composition. The step of thermally treating the substrate and the coating composition may be performed at a temperature of 700° C. or lower, and the above-described coating composition may be used as the coating composition.

For example, tempered glass may be used as the substrate such that the substrate is used for home appliances, for example, such as a cooling appliance.

As described above, the coating composition may have thermal properties in which the coating composition is calcinated at a temperature of 700° C. or lower. Accordingly, the substrate and the coating composition may be thermally treated at the temperature of 700° C. or lower, thereby enabling calcination of the coating composition and tempering of the substrate at the same time.

In some examples, coating glass manufactured using the above-described preparing method may have 80% or greater of visible light transmittance.

In some implementations, referring to FIG. 1, a cooking appliance 1 may include a cavity 11 in which a cooking chamber is formed; and a door 14 that opens and closes the cooking chamber. The door 14 may include a door glass 14', any one surface of which is provided with a coating layer 17, and the coating layer 17 may be disposed based on the above-described coating composition.

In some implementations, the cooking appliance 1 may include at least one of heat sources 13, 15, 16 that supplies heat for heating an object to be cooked in the cooking chamber, for example, in addition to the cavity 11 in which the cooking chamber is formed and the door 14 that opens and closes the cooking chamber.

The cavity 11 may have a cuboid shape, a front surface of which is open. The heat sources 13, 15, 16 may include a convection assembly 13 that discharges heated air into the cavity 11, an upper heater 15 disposed at an upper portion of the cavity 11, and a lower heater 16 disposed at a lower portion of the cavity 11. The upper heater 15 and the lower heater 16 may be provided inside or outside of the cavity 11. In some examples, the heat sources 13, 15, 16 may not necessarily include all the convection assembly 13, the upper heater 15, and the lower heater 16. For instance, the heat sources may include any one or more of the convection assembly 13, the upper heater 15, and the lower heater 16.

Figure 2:
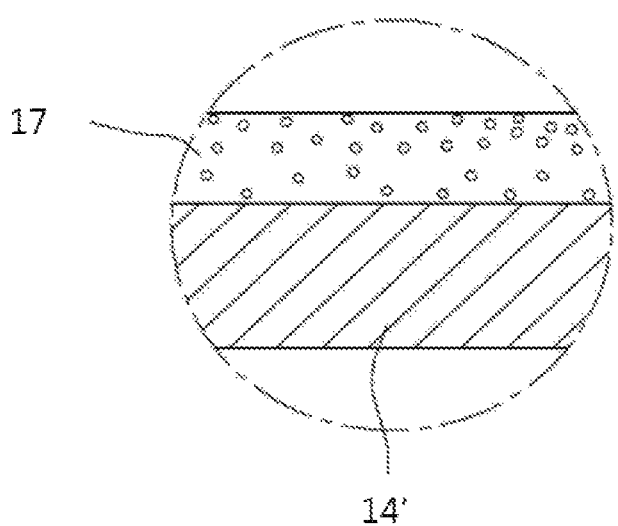
FIG. 2 is an enlarged cross-sectional view of a portion of an example door glass of the cooling appliance in FIG. 1.

In some implementations, referring to FIG. 2, the coating composition may be coated on any one surface of the door glass 14'.

An example of preparation of coating glass is described below.

Coating materials and comparative examples are shown in table 1.

For instance, ammonium dihydrogen phosphate ($NH_4H_2PO_4$) was used as a raw material of $P_2O_5$. Sodium carbonate ($Na_2CO_3$), potassium carbonate ($K_2CO_3$), and lithium carbonate ($Li_2CO_3$) were respectively used as raw materials for $Na_2O$, $K_2O$, and $Li_2O$. Additionally, barium carbonate ($BaCO_3$) and calcium carbonate ($CaCO_3$) were respectively used as a raw materials of BaO and CaO. Components shown in table 1 were used as the rest components.

The materials in table 1 were melted at 1300° C. for 30 minutes and then quenched. Next, D50 of the quenched materials were ground such that the quenched materials were less than 10 μm.

Relative to 100 wt % of each coating material, 5, 6, 7 and 8 wt % of ITO nano powder was mixed with the coating material of implementations 1 to 4, prepared as described above, to prepare a coating composition. In comparative examples 1 and 2, the heat conductive oxide nano powder was not mixed.

Next, the coating composition was mixed with ethyl cellulose and then homogenized using a 3-roll mill. Accordingly, a paste was prepared.

Next, the paste was applied onto soda-lime glass of 200×200 mm and a thickness of 5 T and was thermally treated at 700° C. for five minutes, to prepare coating glass.

TABLE 1

| Coating material component (wt %) | Examples according to implementations of the disclosure | | | | Comparative examples | |
|---|---|---|---|---|---|---|
| | 1 | 2 | 3 | 4 | 1 | 2 |
| $P_2O_5$ | 31 | 31 | 31 | 31 | 55 | 45 |
| $Al_2O_3$ | 18 | 19 | 19 | 19 | 20 | 40 |
| $B_2O_3$ | 13.5 | 11 | 11 | 11 | 5 | 5 |
| $Na_2O$ | 13 | 13 | 13 | 13.75 | 0 | 0 |
| $K_2O$ | 8.5 | 8 | 8 | 8 | 0 | 0 |
| $Li_2O$ | 0 | 2 | 3 | 2 | 4 | 0 |
| ZnO | 13.5 | 13 | 13 | 13 | 6 | 6 |
| $ZrO_2$ | 2.5 | 2 | 2 | 2 | 3 | 1 |
| BaO | 0 | 0.75 | 0 | 0 | 4 | 2 |
| CaO | 0 | 0.25 | 0 | 0.25 | 3 | 1 |

Experimental results of the examples are described below.

Performance of the examples according to the above-described implementations and comparative examples may be evaluated as follows.

For example, vitrification properties of coating layer and any damage done to coating layer were evaluated as follows.

To evaluate vitrification of a coating layer, any formation of a crystal of the coating layer, formed by the coating composition, was observed.

To confirm damage to the coating layer, any crack in the coating layer formed on glass, which was a base material, was observed.

TABLE 2

| | Any vitrification | Any damage to coating layer |
|---|---|---|
| Implementation 1 | ○ | X |
| Implementation 2 | ○ | X |
| Implementation 3 | ○ | X |
| Implementation 4 | ○ | X |

TABLE 2-continued

| | Any vitrification | Any damage to coating layer |
|---|---|---|
| Comparative example 1 | ○ | ○ |
| Comparative example 2 | X | X |

Table 2 shows that the coating layers of implementations 1 to 4 were all formed into non-crystalline ones, and no crack was made in the coating layer formed on the base material.

However, the coating layer of comparative example 2 was hardly transformed into glass due to crystallization caused by an increase in amounts of $Al_2O_3$ and the like. Additionally, the coating layer of comparative example 1 was damaged because the coating layer had cracks due to a difference in coefficients of thermal expansion of the glass as a base material and the coating composition when the coating layer was formed on the base material.

Calcination temperatures of the coating layers were measured.

To confirm any calcination of the coating layer, it was observed whether the coating layer was calcinated at about 700° C. that is a temperature of tempering of glass as a base material.

When being applied to a cooking appliance, for example, glass as a base material may be tempered to improve strength and to ensure safety of users. A calcination process of the coating layer may be performed at the same time as the tempering process of the glass as a base material is performed.

In this case, to confirm any calcination of the coating layer, it was observed whether the coating layer was calcinated at the glass tempering temperature.

TABLE 3

| | Any calcination of coating layer |
|---|---|
| Implementation 1 | ○ |
| Implementation 2 | ○ |
| Implementation 3 | ○ |
| Implementation 4 | ○ |
| Comparative example 1 | X |
| Comparative example 2 | X |

Table 3 shows that the coating layers according to implementations 1 to 4 were calcinated at about 700° C. that is a heating temperature for tempering of glass.

Accordingly, the calcination process of the coating layers according to implementations 1 to 4 may be performed at the same time as the glass tempering process is performed. Thus, an additional calcination process may be omitted, thereby improving processing efficiency.

In case the coating layer is formed after the tempering process, a glass chemical connection of the coating layer, tempered at a calcination temperature, may be broken. However, as the calcination process of the coating layers according to implementations 1 to 4 may be performed at the same time as the glass tempering process is performed, the above-described problem may be solved.

The coating layers according to comparative examples 1 and 2 were not calcinated at about 700° C. that is a heating temperature for tempering of glass. That is, the coating composition of the coating layers according to comparative examples 1 and 2 was calcinated at a temperature higher than 700° C.

Accordingly, the calcination process of the coating layers according to comparative examples 1 and 2 may not be performed at the same time as the glass tempering process is performed. Thus, an additional calcination process of a coating layer may be required in the coating layer according to the comparative examples 1 and 2, thereby deteriorating a processing efficiency.

Further, as the coating layer is additionally formed after the tempering process, a glass chemical connection of the coating layer tempered at the calcination temperature may be broken, and strength of the glass may decrease.

A light transmittance of the coating layers were measured.

To measure light transmittance of the coating layer, transmittance of light in a visible light range having a wavelength range of about 380 nm to about 780 nm was measured using an ultraviolet (UV) visible spectrophotometer.

Light transmittance of glass as a base material before the coating layer was coated was about 80%. After the coating layer was formed, visible light transmittance of the glass, on which the coating layer was formed, was measured using the UV visible spectrophotometer.

TABLE 4

|  | Visible light transmittance (%) |
| --- | --- |
| Implementation 1 | 80.1 |
| Implementation 2 | 82.0 |
| Implementation 3 | 81.9 |
| Implementation 4 | 81.2 |
| Comparative example 1 | Impossible to measure |
| Comparative example 2 | 20 |

Table 4 shows that tempered glass, on which coating layers according to implementations 1 to 4 were formed, had visible light transmittance of 80% or higher. That is, when the tempered glass on which the coating layer is formed is applied to a cooking appliance and the like, users may easily and clearly look into the cooking appliance from the outside with the naked eye.

However, tempered glass on which coating layers according to comparative examples 1 and 2 were formed had low visible light transmittance. That is, when the tempered glass on which the coating layer is formed is applied to a cooking appliance and the like, users may not easily and clearly look into the cooking appliance from the outside with the naked eye.

A cleaning performance of the coating layer was evaluated as follows.

A surface of the coating layer was washed with distilled water or alcohol, for example, and then a jig for applying contaminants was disposed on the coating layer. Then the contaminants were thinly applied on a surface area (10 mm×10 mm) of the coating layer with a brush and then were fixed.

In this case, monster mash or chicken fat was used as the contaminants.

Then, the hardened contaminant was cleaned with a wet kitchen scrubber, using a force of 3 kgf or less. As in table 5, frequency of back and forth cleaning motions made to the hardened contaminant was measured and the frequency was defined as a frequency of back and forth cleaning motions. Table 6 below shows indices of the evaluation.

TABLE 5

| Frequency of back and forth cleaning motions | Level |
| --- | --- |
| 5 or less | 5 |
| 10 or less | 4 |
| 15 or less | 3 |
| 25 or less | 2 |
| More than 25 | 1 |

TABLE 6

|  | Cleaning performance |
| --- | --- |
| Implementation 1 | 4 |
| Implementation 2 | 5 |
| Implementation 3 | 5 |
| Implementation 4 | 5 |
| Comparative example 1 | Impossible to measure |
| Comparative example 2 | 1 |

Table 5 and 6 show that the tempered glass on which the coating layers according to implementations 1 to 4 were formed had an improved cleaning performance.

That is, the coating layers according to implementations 1 to 4 may have a maximum level of hydrophilicity on the basis of an optimal range of composition ratios of the coating composition, thereby ensuring ease of removing contaminants attached to a surface of the coating layer only with a wet kitchen scrubber.

The coating layers of the implementations may have improved hydrophilicity and may help water to effectively permeate onto an interface between the coating layer and contaminants on the coating layer when being washed, thereby ensuring ease of removing the contaminants from the coating layer.

However, the coating layers of comparative examples 1 and 2 have low hydrophilicity. Accordingly, contaminants on the coating layers of the comparative examples may not be easily removed only with a wet kitchen scrubber.

An infrared reflective function of the coating layer was evaluated as follows.

Each sample of the implementations and comparative examples was applied to a door of an oven, and while a temperature inside the oven was maintained at 350° C. for 30 minutes, a maximum temperature of a surface of glass, on which the coating layer was not formed, was measured.

TABLE 7

|  | Maximum temperature of a surface without coating layer (° C.) |
| --- | --- |
| Implementation 1 | 58 |
| Implementation 2 | 57 |
| Implementation 3 | 55 |
| Implementation 4 | 55 |
| Comparative example 1 | 105 |
| Comparative example 2 | 105 |

Referring to table 7, in Implementation 1 to 4, the surface, on which the coating layer was not formed, had a maximum temperature of 60° C. or lower. Accordingly, the coating layer of implementation 1 to implementation 4 had an excellent infrared reflective function. In comparative examples 1 and 2, the surface, on which the coating layer was not formed, had a maximum temperature of more than 100° C.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cooking appliance, comprising:
   a cooking chamber;
   a door configured to open and close the cooking chamber, the door comprising a door glass;
   a coating layer disposed at least one surface of the door glass and made of a coating composition, the coating composition comprising a coating material and a heat conductive oxide nano powder that is 5 to 10 wt % with respect to a weight of the coating material,
   wherein the coating material comprises:
   20 to 40 wt % of phosphorus pentoxide ($P_2O_5$),
   17 to 29.5 wt % of aluminum oxide ($Al_2O_3$),
   0.5 to 3 wt % of zirconium dioxide ($ZrO_2$),
   10 to 30 wt % of sodium oxide ($Na_2O$) and potassium oxide ($K_2O$),
   10 to 25 wt % of boron trioxide ($B_2O_3$), and
   10 to 15 wt % of zinc oxide (ZnO).

2. The cooking appliance of claim 1, wherein a light transmittance of the door glass for visible light is greater than or equal to 80%.

3. The cooking appliance of claim 1, wherein the coating material further comprises 5 or less wt % of at least one of lithium oxide ($Li_2O$), barium oxide (BaO), or calcium oxide (CaO).

4. The cooking appliance of claim 1, wherein the coating material includes 10 to 20 wt % of $Na_2O$, and 5 to 10 wt % of $K_2O$.

5. The cooking appliance of claim 1, wherein the heat conductive oxide nano powder includes at least one of indium tin oxide (ITO), tin oxide ($SnO_x$), titanium oxide ($TiO_x$) and zinc oxide ($ZnO_x$).

6. The cooking appliance of claim 1, wherein a calcination temperature of the coating composition is less than or equal to 700° C.

7. The cooking appliance of claim 1, wherein the coating layer is coated on and in direct contact with the at least one surface of the door glass.

* * * * *